United States Patent
Kalogeropulos et al.

(10) Patent No.: US 8,726,251 B2
(45) Date of Patent: May 13, 2014

(54) PIPELINED LOOP PARALLELIZATION WITH PRE-COMPUTATIONS

(75) Inventors: Spiros Kalogeropulos, Los Gatos, CA (US); Partha Pal Tirumalai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 399 days.

(21) Appl. No.: 13/074,253

(22) Filed: Mar. 29, 2011

(65) Prior Publication Data

US 2012/0254888 A1    Oct. 4, 2012

(51) Int. Cl.
*G06F 9/45* (2006.01)
*G06F 9/38* (2006.01)

(52) U.S. Cl.
CPC ............. *G06F 8/456* (2013.01); *G06F 8/433* (2013.01); *G06F 8/445* (2013.01); *G06F 8/49* (2013.01); *G06F 8/452* (2013.01); *G06F 8/443* (2013.01); *G06F 9/3836* (2013.01)
USPC ........... 717/150; 717/140; 717/149; 717/160; 717/161

(58) Field of Classification Search
CPC ............. G06F 8/456; G06F 8/49; G06F 8/45; G06F 8/452; G06F 8/4452; G06F 8/443; G06F 8/433; G06F 8/445; G06F 9/3836
USPC ......... 717/104, 105, 128, 127, 140, 149, 150, 717/160–161
See application file for complete search history.

(56) References Cited

U.S. PATENT DOCUMENTS

| | | | |
|---|---|---|---|
| 6,704,692 B1 * | 3/2004 | Banerjee et al. | 702/189 |
| 6,772,415 B1 * | 8/2004 | Danckaert et al. | 717/161 |
| 7,089,545 B2 * | 8/2006 | Bera | 717/160 |
| 7,171,544 B2 * | 1/2007 | Bera | 712/216 |
| 7,475,393 B2 * | 1/2009 | Essick et al. | 717/151 |
| 7,984,431 B2 * | 7/2011 | Kejariwal et al. | 717/151 |
| 8,146,071 B2 * | 3/2012 | Silvera et al. | 717/160 |
| 8,151,252 B2 * | 4/2012 | Song et al. | 717/140 |
| 8,239,843 B2 * | 8/2012 | Song et al. | 717/149 |
| 8,448,155 B2 * | 5/2013 | Bordelon et al. | 717/149 |
| 8,479,185 B2 * | 7/2013 | Kalogeropulos et al. | 717/160 |

(Continued)

OTHER PUBLICATIONS

Efficient Synchronization for a Large-Scale Multi-Core Chip Architecture—Weirong Zhu—University of Delaware—2007.*

(Continued)

*Primary Examiner* — Lewis A Bullock, Jr.
*Assistant Examiner* — Francisco Aponte
(74) *Attorney, Agent, or Firm* — Marsh Fischmann & Breyfogle LLP; Daniel J. Sherwinter

(57) ABSTRACT

Embodiments of the invention provide systems and methods for automatically parallelizing loops with non-speculative pipelined execution of chunks of iterations with pre-computation of selected values. Non-DOALL loops are identified and divided the loops into chunks. The chunks are assigned to separate logical threads, which may be further assigned to hardware threads. As a thread performs its runtime computations, subsequent threads attempt to pre-compute their respective chunks of the loop. These pre-computations may result in a set of assumed initial values and pre-computed final variable values associated with each chunk. As subsequent pre-computed chunks are reached at runtime, those assumed initial values can be verified to determine whether to proceed with runtime computation of the chunk or to avoid runtime execution and instead use the pre-computed final variable values.

20 Claims, 7 Drawing Sheets

(56) References Cited

U.S. PATENT DOCUMENTS

| | | | |
|---|---|---|---|
| 8,543,993 B2* | 9/2013 | Yamashita | 717/150 |
| 8,561,046 B2* | 10/2013 | Song et al. | 717/161 |
| 8,612,949 B2* | 12/2013 | Liao et al. | 717/150 |
| 2004/0230960 A1* | 11/2004 | Nair et al. | 717/140 |
| 2006/0064692 A1* | 3/2006 | Sanchez et al. | 718/100 |
| 2007/0022422 A1* | 1/2007 | Tirumalai et al. | 718/100 |
| 2007/0169061 A1* | 7/2007 | Bera et al. | 717/160 |
| 2009/0150890 A1* | 6/2009 | Yourst | 718/102 |
| 2010/0199257 A1* | 8/2010 | Biggerstaff | 717/104 |
| 2010/0306733 A1* | 12/2010 | Bordelon et al. | 717/106 |
| 2010/0306753 A1* | 12/2010 | Yi et al. | 717/149 |

OTHER PUBLICATIONS

Yonghong Song, Spiros Kalogeropulos and Partha Tirumalai for Design and Implementation of a Compiler Framework for Helper Threading on Multi-Core Processors, IEEE PACT 2005: 99-109.

* cited by examiner

PIPELINED LOOP PARALLELIZATION WITH PRE-COMPUTATIONS

FIELD

Embodiments of the present invention relate generally to program parallelization, and, more particularly, to parallelization multi-threaded architectures.

BACKGROUND

The performance of computer systems is dependent on both hardware and software. Parallel systems, such as multi-threaded processor machines, are increasingly common. Two trends are broadening this usage pattern from systems for a specialized community of engineers and scientists to commonplace desktop systems. First, due to the reduction in geometric dimensions of devices and metal routes on-chip, it is common to have larger caches, multi-threading capability on processor cores, multiple cores on-chip, and special-purpose accelerators such as digital signal processors (DSPs) or cryptographic engines on-chip. These systems will have lots of hardware threads but are not expected to run at much higher clock frequencies. Second, techniques for automatic parallelization have been advancing. These capabilities may increase system performance by simultaneously executing multiple processes, and corresponding multiple threads, simultaneously.

To what extent the available hardware parallelism can be exploited may depend on the amount of parallelism inherent in a given software application. In addition to advances in hardware design, advances in compiler design attempt to extract further parallelism available in applications to reduce inefficient code execution. Automatic parallelization has been well studied in the past. Automatic parallelization seeks to parallelize sequential programs such that the resulting executable(s) may have improved performance on multi-threaded machines. Little or no parallelization effort is provided from the user as most of the work is done by the compiler and an accompanying runtime library.

One optimization that may be performed by the compiler is augmenting the source code with additional instructions at a location in the code before an identified parallel region. Identifying a parallel region may comprise detecting one or more of the following: a "for" or "while" loop construct, a user-specified directive such as an OpenMP pragma, a first function call with no data dependencies on a second function call, and a first basic block with no data dependencies on a second basic block.

Modern automatic parallelization techniques parallelize a loop construct if the compiler is certain that all loop iterations can be executed simultaneously. This is possible for loops having no cross-iteration dependencies. When there is certainty of this condition, these loops may be referred to as DOALL loops. For example, a loop can be executed in fully parallel form, without synchronization, if the desired outcome of the loop does not depend upon the execution ordering of the data accesses from other different iterations. In order to determine whether or not the execution order of the data accesses affects the semantics of the loop, the data dependence relations between the statements in the loop body may be analyzed. Accordingly, the dependence analysis can be used to categorize loops as DOALL or non-DOALL loops.

For any DOALL loops, traditional automatic parallelization techniques can reliably be used. For non-DOALL loops, cross-iteration dependencies (or even the potential for cross-iteration dependencies) can frustrate the applicability of many traditional automatic parallelization techniques. Thus, to extract further instruction level parallelism (ILP) from an application when non-DOALL loops are involved, additional or alternate techniques may be used.

One traditional technique for attempting to parallelize non-DOALL loops is to use helper threading, whereby a helper thread executes an abbreviated (or otherwise trimmed-down) version of an original loop construct on a different hardware thread that may provide preparatory work ahead of the actual execution work of loops. For example, memory reference address calculations and prefetching of data may occur ahead of the execution of the work to perform an algorithm or method of the loop. The non-DOALL loop may be segmented into a main thread and one or more non-main threads to be executed sequentially in program order.

A separate helper thread and the main thread typically share at least one level of the cache. The helper thread attempts to prefetch data into the shared cache in order that the main thread retrieves data directly from the shared cache without accessing a lower-level memory due to misses to the shared cache. An example of helper threading is provided in Y. Song et al., Design and Implementation of a Compiler Framework for Helper Threading on Multi-core Processors, IEEE PACT, 2005, pp. 99-109.

While the helper threads accelerate the execution of the loop by prefetching and/or other techniques, they do not typically perform any of the loop computations. Accordingly, the level of acceleration realized from the use of helper threads may be reduced when a loop involves highly complex computations. Further, helper thread techniques may limit cache utilization potential. For example, for the helper thread to deliver data to cache of the main thread, the helper thread and main thread may both have to be running on a single core and using only that core's cache hierarchy.

Another traditional technique for attempting to parallelize non-DOALL loops is to use speculative automatic parallelization. According to speculative automatic parallelization, hardware transactional memory support may be used (such as the underlying hardware's checkpoint/commit capability) to speculatively execute a loop. Loop iterations may be divided among the main thread and non-main threads. Each non-main thread will attempt to speculatively execute the loop body, where the loop body is encapsulated inside a checkpoint/commit region. A transaction failure will trigger either retries of the same speculative execution, or waiting to execute the work non-speculatively after the previous logical thread has completed its work.

It may often be difficult to detect and/or recover from transaction failures (e.g., errors in speculative execution). For example, if loop variables in iteration K of the loop are affected by computations during previous iteration J of the loop, speculative computations of the Kth iteration may be incorrect. The technique must be able to both reliably detect the incorrectly pre-computed values and to reliably roll back execution of the program to an appropriate execution location. Accordingly, speculative automatic parallelization techniques may involve additional costs, including additional hardware support and additional time and resources expended in unused pre-computations, clean-up, and bookkeeping.

BRIEF SUMMARY

Among other things, systems and methods are described for automatically parallelizing pre-computations of non-DOALL loops. Embodiments identify non-DOALL loops, and divide the loops into chunks. The chunks are assigned to separate threads, such that the threads have an ordinality that corresponds to the program execution order. For example, a loop having 1,000 iterations may be divided into five chunks, where the first chunk includes iterations 1 through 200; the second chuck includes iterations 201 through 400, etc. In some configurations, the separate threads are assigned to different logical processors (e.g., different cores, different core pipelines, etc.). Techniques may also be used to optimize chunk sizes prior to assignment, for example, to balance pre-computation predictability against overhead costs of chunking (e.g., from synchronization, etc.).

As a thread performs its runtime computations, later threads (i.e., those threads having a higher ordinality) attempt to pre-compute their respective chunks of the loop. These pre-computations may result in a set of assumed initial values and pre-computed final variable values associated with each chunk. As subsequent pre-computed chunks are reached at runtime, those assumed initial values can be verified to determine whether to proceed with runtime computation of the chunk or to avoid runtime execution and instead use the pre-computed final variable values.

For example, Thread A completes loop computations for corresponding Chunk A, and Chunk B is triggered for runtime execution. If Chunk B has been pre-computed (e.g., by corresponding Thread B), its assumed initial variable values are checked against the current runtime values of those variables. If the assumed initial variable values associated with Chunk B equal the current runtime values of those variables, the pre-computed final variable values associated with Chunk B can be reliably used without re-computation of the chunk. Otherwise, runtime execution can continue with Chunk B computations substantially as if no pre-computations had occurred (e.g., without any need for rollback or recovery). Notably, embodiments may pre-compute only portions of chunks. For example, one or more pre-computable portions of a chunk may be pre-computed, thereby constituting a portion or the entirety of the chunk.

According to one set of embodiments, a method is provided. The method parallelizes a set of program instructions from a computer program into a plurality of threads to be executed on at least one processor. The program instructions identify a computation to be performed over a plurality of iterations, such that each thread is configured to compute an output value as a function of an input variable (i.e., one or more input variables) according to a corresponding portion of the iterations of the computation, During runtime execution of a first thread on the at least one processor, the method pre-computes the portion of the iterations of the computation corresponding to a second thread by: determining a predicted input value of the input variable according to the portion of the iterations of the computation corresponding to the second thread; computing the output value as a function of the predicted input value over the portion of the iterations of the computation corresponding to the second thread to generate a pre-computed output value; and storing the predicted input value and the pre-computed output value in association with the second thread. Subsequent to runtime execution of the first thread and prior to runtime execution of the second thread the method: determines a current input value of the input variable according to the portion of the iterations of the computation corresponding to the second thread; compares the current input value to the predicted input value stored in association with the second thread; and computes the output value as a function of the current input value over the portion of the iterations of the computation corresponding to the second thread only when the current input value does not equal the predicted input value stored in association with the second thread.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Embodiments described herein automatically parallelize pre-computations of non-DOALL loops. In some cases, non-DOALL loops are identified and divided into chunks. The chunks are assigned to separate software threads, which may then be assigned to hardware threads (e.g., logical processors, including processor cores, core pipelines, etc.). It may be desirable for the threads to have an ordinality that corresponds to the program execution order. For example, a loop having 1,000 iterations may be divided into five chunks, where the first chunk includes iterations 1 through 200; the second chuck includes iterations 201 through 400, etc. Techniques may be used to synchronize thread execution, to optimize chunk sizes prior to assignment, etc.

While a thread performs its runtime computations, some or all of the later threads (i.e., those threads having a higher ordinality) attempt to pre-compute their respective chunks of the loop. These pre-computations may result in a set of assumed initial values and pre-computed final variable values associated with each chunk. As subsequent pre-computed chunks are reached at runtime, those assumed initial values can be verified to determine whether to proceed with runtime computation of the chunk or to avoid runtime execution and instead use the pre-computed final variable values.

Figure 1:
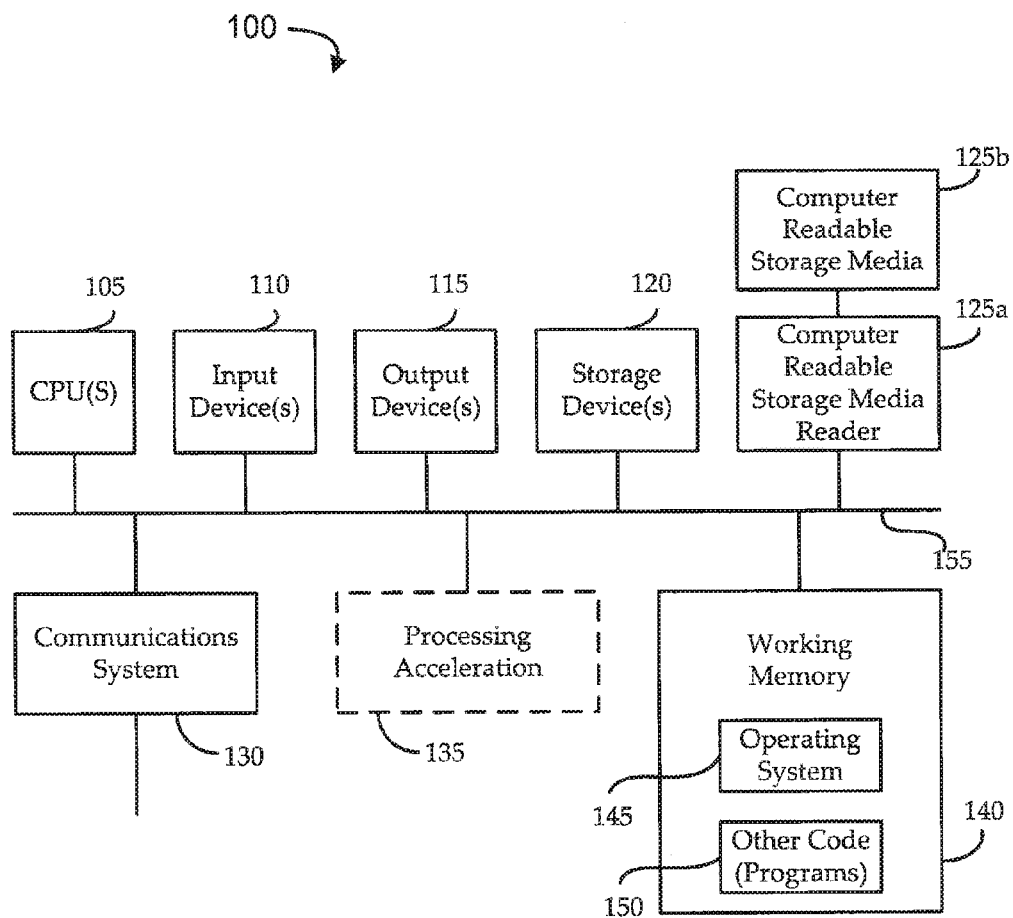
FIG. 1, an exemplary computational environment is shown, in the context of which various embodiments of the present invention may be implemented.

Turning first to FIG. 1, an exemplary computational environment 100 is shown, in the context of which various embodiments of the present invention may be implemented. The computational environment 100 may be implemented as or embodied in single or distributed computer systems, or in any other useful way. The computational environment 100 is shown comprising hardware elements that may be electrically coupled via a bus 155. The hardware elements may include one or more central processing units (CPUs) 105, one or more input devices 110 (e.g., a mouse, a keyboard, etc.), and one or more output devices 115 (e.g., a display device, a printer, etc.). The computational environment 100 may also include one or more storage device 120. By way of example, storage device(s) 120 may be disk drives, optical storage devices, solid-state storage device such as a random access memory (RAM) and/or a read-only memory (ROM), which can be programmable, flash-updateable and/or the like.

The computational environment 100 may additionally include a computer-readable storage media reader 125a, a communications system 130 (e.g., a modem, a network card (wireless or wired), an infra-red communication device, etc.), and working memory 140, which may include RAM and ROM devices as described above. In some embodiments, the computational environment 100 may also include a processing acceleration unit 135, which can include a DSP, a special-purpose processor and/or the like.

The computer-readable storage media reader 125a can further be connected to a computer-readable storage medium 125b, together (and, optionally, in combination with storage device(s) 120) comprehensively representing remote, local, fixed, and/or removable storage devices plus storage media for temporarily and/or more permanently containing computer-readable information. The communications system 130 may permit data to be exchanged with the network 120 and/or any other computer described above with respect to the computational environment 100.

The computational environment 100 may also comprise software elements, shown as being currently located within a working memory 140, including an operating system 145 and/or other code 150, such as an application program (which may be a client application, web browser, mid-tier application, RDBMS, etc.). It should be appreciated that alternate embodiments of a computational environment 100 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 100 may include code 150 for implementing embodiments of the present invention as described herein.

Embodiments are configured to run in multi-threaded environments, including those supported in hardware by the CPUs 105. The CPUs 105 may include multiple cores and/or each core may include multiple pipelines. As used herein, the term "logical processor" is intended to broadly include hardware-enabled parallelization, for example, using multiple cores and/or core pipelines of the CPUs 105.

Figure 2:
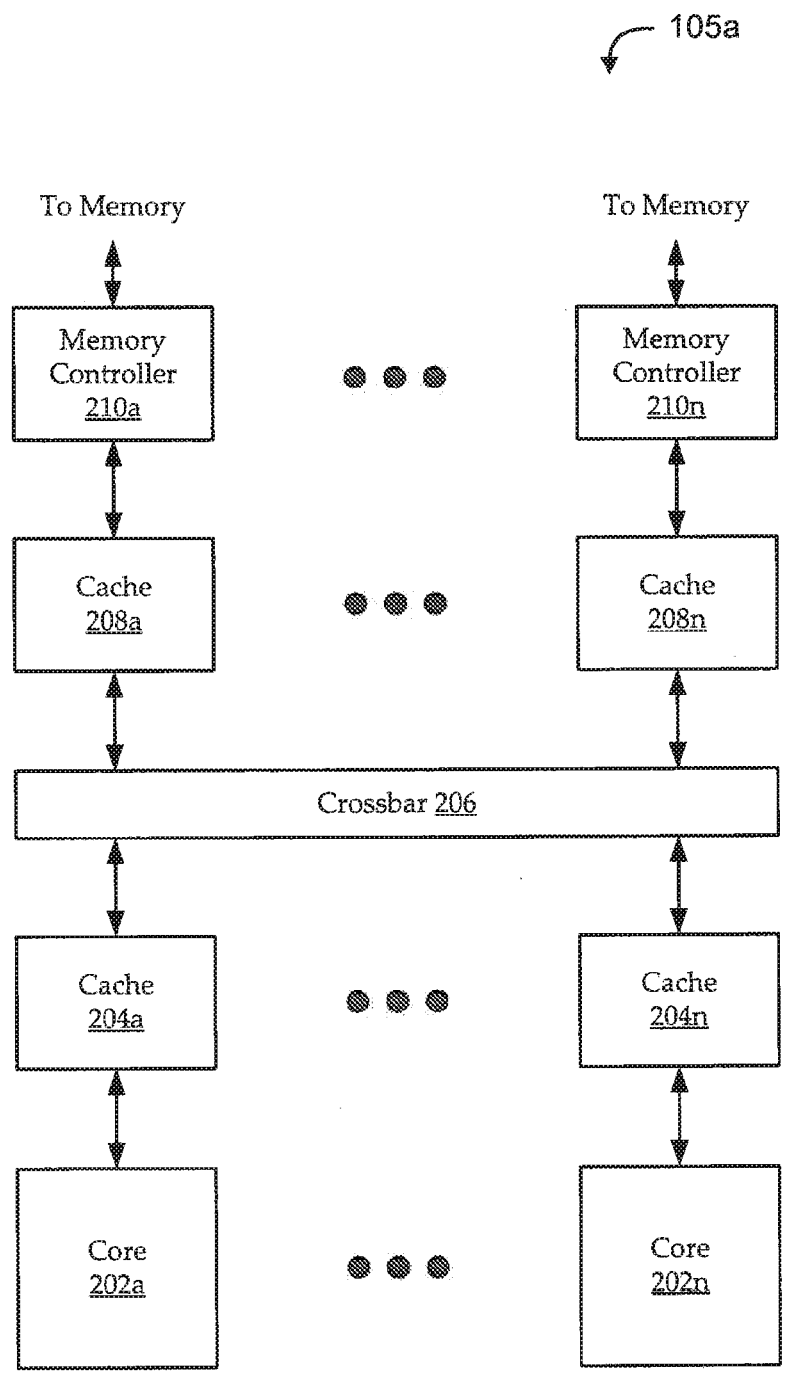
FIG. 2 shows an illustrative embodiment of a multi-core microprocessor for use with various embodiments.

FIG. 2 shows an illustrative embodiment of a multi-core microprocessor 105a for use with various embodiments. The microprocessor 105a may be an implementation of one or more of the CPUs 105 of FIG. 1, and is shown as having an arbitrary number of cores 202a-202n. As discussed above, each core 202 may include a superscalar micro-architecture with one or more multi-stage pipelines.

Each core 202 may be configured to execute instructions of software applications corresponding to an instruction set architecture (ISA) such as x86, SPARC, PowerPC, MIPS, ARM, or other. Also, each core 202 may be designed to execute multiple strands, or threads. For example, a multi-thread software application may have each of its software threads scheduled to be executed on a separate pipeline within a core 202, or alternatively, a pipeline may process multiple threads via control at certain function units. Each core 202 may comprise a first-level cache 204 that is physically implemented inside or outside the respective core 202.

A crossbar 206 may be used to connect each core 202 and first-level cache 204 to shared resources such as second-level caches 208 and lower-level memory via memory controllers 210. Interfaces between crossbar 206 and the different levels of caches 204 and 208 may comprise any suitable technology. In other embodiments, other levels of caches may be present between cache 208 and memory controller 210. Also, an I/O bus adapter, not shown, may be coupled to crossbar 206 to provide an interface for I/O devices to caches 204 and 208 and cores 202. In another embodiment, an I/O interface may be implemented in memory controller 210. Memory controllers 210 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 210 on microprocessor 200.

A multi-thread software application may be written by a designer to be executed on a multi-core processor, such as the one in FIG. 2, or on a multi-processor chip. The multi-thread program may be compiled prior to execution on a system such as microprocessor 105a. A compiler is a set of programs for translating source code, such as a multi-thread software program, into another computer language, or target code.

For example, software code may typically be written by a programmer designer in a high-level language such as C, C++, Fortran, or other. This so-called source code may be stored on a computer readable medium (e.g., storage device(s) 120 or computer readable medium 125b of FIG. 1). A command instruction, which may be entered at a prompt by a user or placed within a scripting language, with any necessary options may be executed in order to compile the source code.

Front-end compilation can translate the source code to a lower-level representation. Syntactic and semantic processing, as well as some optimizations, are typically performed at this stage. Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases. An advantage of splitting the front-end of a compiler from the back-end is that front-ends for different languages may be combined with back-ends for different processors. Generally speaking, the front-end performs syntactic and semantic processing and translates the source code to a lower-level of representation.

Optimizations may be performed on the lower-level representation. The independence provided by this representation of the source code from the machine code allows generic optimizations to be shared between versions of the compiler. In one embodiment, the compilation method is completely static and the lower-level representation is an output of a front-end phase to be further compiled statically into machine code. Machine code is a general term that refers to patterns of bits with different patterns corresponding to different commands, or instructions, to the machine, or processor, and to the operating system. In an alternative embodiment, the compilation method is static upfront wherein the lower-level representation is bytecode to be further compiled dynamically into machine code by a MT compiler within a virtual machine.

The back-end may perform more transformations and optimizations for a particular computer architecture and processor design. A processor may be designed to execute instructions of a particular instruction set architecture (ISA), but the processor may have one or more processor cores (e.g., as shown in FIG. 2). The manner in which a software application is executed in order to reach peak performance may differ greatly between a single-, dual-, or quad-core processor. Regardless, the manner in which to compile the software application in order to achieve peak performance may vary between a single-core and a multi-core processor.

One back-end optimization that may be performed is automatic parallelization. Loops with an iteration count that can be determined by a compiler before the loop is executed and has an unchanging loop index are referred to as "countable" loops. Traditional automatic parallelization techniques attempt to parallelize loops that do not have cross-iteration dependences, for example, so that all loop iterations may be executed at the same time. Generally speaking, there are three possible types of dependences between two statements that access the same memory location: flow (read after write, or RAW), anti (write after read, or WAR), and output (write after write, or WAW). Flow dependences are data producer and consumer dependences, since they express a fundamental relationship about the data flow in the program. Anti and output dependences, also known as memory related dependences, are caused by the reuse of memory, such as program variables.

If there are flow dependences between accesses in different iterations of a loop, then the semantics of the loop may not be guaranteed if the loop is executed in fully parallel form. The iterations of such a loop are not independent because values that are computed (produced) in one iteration of the loop are used (consumed) during a later second iteration of the loop.

Most automatic parallelization is implemented with a fork-join model. The main, or Master, thread will fork a set of N−1 other threads, or slave threads, wherein N is an integer value, such that the work in the parallel loop will be shared amongst all N threads. The thread management and work partitioning tasks are often processed in a separate parallelization library (PL).

The task of spawning and terminating threads, as well as scaling the number of threads according to the number of available processors or processor cores, may be performed by code in the parallelization library (PL). The back-end compiler may expose parallel constructs such as a "for" or a "while" loop by replacing the code in the lower-level representation with method or function calls defined in a PL. These function calls may include a call for a main thread, or a master thread. The main thread includes codes to communicate and synchronize with slave threads, or non-main threads.

The PL will apply a scheduling policy, which may be determined and passed in by the back-end compiler, to partition work among multiple threads. As one skilled in the art is aware, there are many different scheduling policies. The most common scheduling policy is called "static" scheduling, which tries to distribute original work evenly across all non-main threads.

Figure 3:
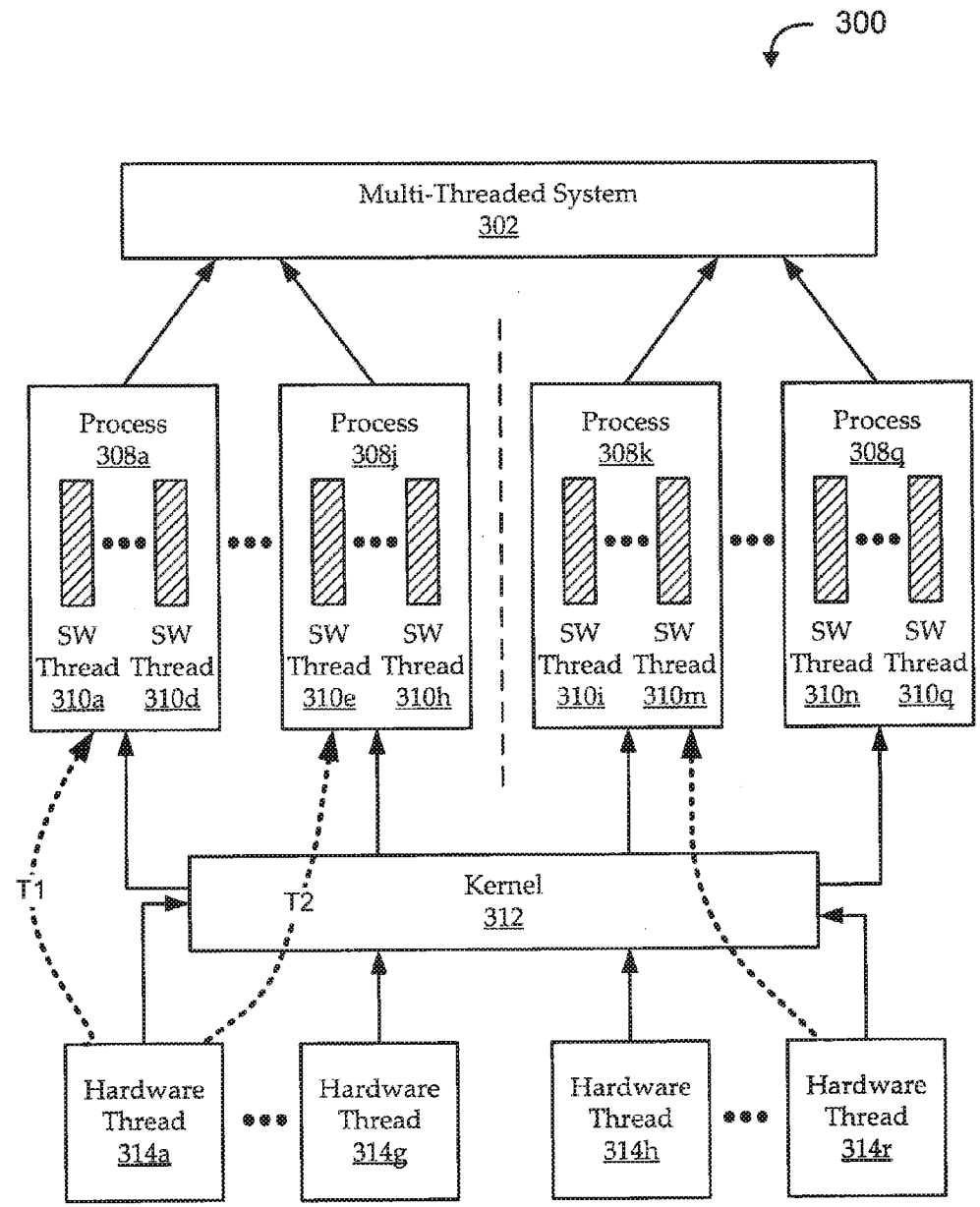
FIG. 3 illustrates one embodiment of hardware and software thread interrelationships.

For the sake of added clarity, FIG. 3 illustrates one embodiment of hardware and software thread interrelationships 300. Here the partitioning of hardware and software resources and their interrelationships during the execution of one or more applications is shown. In one embodiment, the operating system on the nodes in multi-processor system 302 (e.g., implemented as the CPU(s) 105 of FIG. 1) allocates regions of memory for the transaction spaces 304a-304k. In one embodiment, the software maintains which regions of the transaction spaces 304 are available for the execution of transactions 306 and handles the condition wherein insufficient space is available for transaction execution.

When applications, or computer programs, execute, each application may comprise multiple processes, such as processes 308a-308j and 308k-308q in FIG. 3. In such an embodiment, each process 308 may own its own resources such as an image of memory, or an instance of instructions and data before application execution. Also, each process 308 may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Multi-threaded system 302 (e.g., a system having multiple logical processors) typically supports many processes. Within each of the processes 308 may be one or more software threads 310. For example, process 308a comprises SW threads 310a-310d. A thread can execute independent of other threads within its corresponding process and a thread can execute concurrently with other threads within its corresponding process.

Generally speaking, each of the software threads 310 belongs to only one of the processes 308. Therefore, for multiple threads 310 of the same process 308, such as SW threads 310a-310d of process 308a, the same data content of a memory line, for example the line of address 0xfS38, will be the same for all threads. This assumes the inter-thread communication has been made secure and handles the conflict of a first thread, for example SW thread 310a, writing a memory line that is read by a second thread, for example SW thread 310d. However, for multiple threads of different processes, such as SW thread 310a in process 308a and SW thread 310e of process 308j, the data content of memory line with address 0xff38 will more than likely be different for the threads. In some cases, multiple threads of different processes may see the same data content at a particular address, for example, if they are sharing a same portion of address space.

In general, for a given application, kernel 312 sets up an address space for the application, loads the application's code into memory, sets up a stack for the program, branches to a given location inside the application, and begins execution of the application. Kernel 312 may further determine a course of action when insufficient memory is available for the execution of the application. As stated before, an application may be divided into more than one process 308 and system 302 may be running more than one application. Therefore, there may be several processes running in parallel. Kernel 312 may decide at any time which of the simultaneous executing processes should be allocated to the processor(s). Kernel 312 may allow a process to run on a core of a processor, which may have one or more cores, for a predetermined amount of time referred to as a time slice.

In one embodiment, only one process can execute at any time per processor core, CPU thread, or Hardware Thread. As illustrated, hardware threads 314a-314g and 314-314r include hardware that can handle the execution of the one or more software threads 310 within one of the processes 308. This hardware may be a core, such as core 202 of FIG. 2, or a subset of circuitry within a core configured to execute multiple threads. For example, system 302 may include a multi-core microprocessor (e.g., microprocessor 105a of FIG. 2 with cores 202). Although the multi-threading hardware may reside within the system 302, hardware threads 314 are shown outside of system 302 for illustrative purposes of assignments made by kernel 312.

The dashed lines denote assignments and do not necessarily denote direct physical connections. For example, hardware thread 314a is illustrated as assigned to process 308a at a time T1. However, at a later time T2 (e.g., after a context switch), hardware thread 314a is illustrated as assigned to process 308j.

In one embodiment, an ID is assigned to each of the hardware threads 314. This hardware thread ID can be used to assign one of the hardware threads 314 to one of the processes 308 for process execution. Kernel 312 typically handles this assignment. For example, similar to the above example, a hardware thread ID may be used to assign hardware thread 314r to process 308k as illustrated. This assignment is performed by kernel 312 prior to the execution of any applications. In the event of a context switch (e.g., due to an end of a time slice), hardware thread 314r may be re-assigned to process 308q. In such a case, data and state information of process 308k is stored by kernel 312 and process 308k is removed from hardware thread 314r. Data and state information of process 308q may then be restored to hardware thread 314r, and process execution may resume.

It will be appreciated that any of the above systems can be used to effectuate automatic parallelization and other techniques used by embodiments described herein. Further, many architectures are possible with which to implemented embodiments, including implementing parallelized execution of applications. For example, the systems of FIGS. 2 and 3 assume a combination of hardware and software multi-threading. However, embodiments may similarly be implemented in environments that have no (or insufficient) hardware support for multi-threading. Accordingly, discussions herein of parallelization, multi-threading, and the like should not be construed as being implemented in any particular hardware environment, except where explicitly noted.

It is worth noting that, for the sake of simplicity, some discussions above (e.g., in the context of FIG. 2) ignore parallelization issues resulting from inter-dependences among loop iterations. As used herein, loop and similar constructs for which the compiler is certain that all loop iterations can be executed simultaneously (i.e., that there are no cross-iteration dependencies) are referred to herein as "DOALL" loops. Any loop for which the compiler cannot be certain whether there are any cross-iteration dependencies (e.g., no determination is made, the determination is inconclusive, the determination conclusively establishes that at least one dependence exists, etc.) are referred to herein as "non-DOALL" loops. For example, the compiler can be configured to perform dependence analyses to categorize any loop constructs as DOALL or non-DOALL loops.

As discussed above, traditional automatic parallelization techniques can reliably be used for DOALL loops, as there are no issues with interdependences across chunks allowing for full parallelization. For non-DOALL loops, cross-iteration dependencies (or even the potential for cross-iteration dependencies) can frustrate the reliability of many traditional automatic parallelization techniques. Thus, to extract further instruction level parallelism (ILP) from an application when non-DOALL loops are involved, additional or alternate techniques may be used.

Traditional techniques for parallelizing non-DOALL loops tend to fall into two categories. A first category speculatively pre-computes data for future loop iterations while current iterations are being computed at runtime. For example, certain assumptions are made about initial values for the loop variables associated with the iterations, and final values are pre-computed for those iterations. The assumptions must later be validated, and if found to be incorrect, the program must roll back to a previous (validated) stage. Detection of and/or recovery from these errors in speculation may be difficult and costly.

A second category uses helper threads or similar techniques in an attempt to prefetch program components (e.g., data from memory) to the cache hierarchy of the main thread. By avoiding at least some memory accesses at runtime, the main thread is effectively accelerated. Notably, only the main thread performs the computations. Accordingly, while certain costs can be minimized by avoiding speculation-related errors, the parallelization benefits are limited to savings from memory accesses (e.g., computationally intensive loops with few memory accesses may not be highly accelerated using these techniques). Further, for the helper thread to deliver data to cache of the main thread, the helper thread and main thread may both have to be running run on a single core and using only that core's cache hierarchy.

Accordingly, traditional techniques for automatic parallelization of non-DOALL loops are limited in a number of ways. For example, speculative computation techniques can save future computation time, but can also potentially incur substantial costs where rollbacks are needed. Similarly, prefetching techniques (e.g., using helper threads) can save future memory access time, but its resulting acceleration can be limited by cache architectures and computational complexity of the loop. As described herein, embodiments pre-compute (e.g., and may also prefetch), but in a non-speculative manner.

Figure 4:
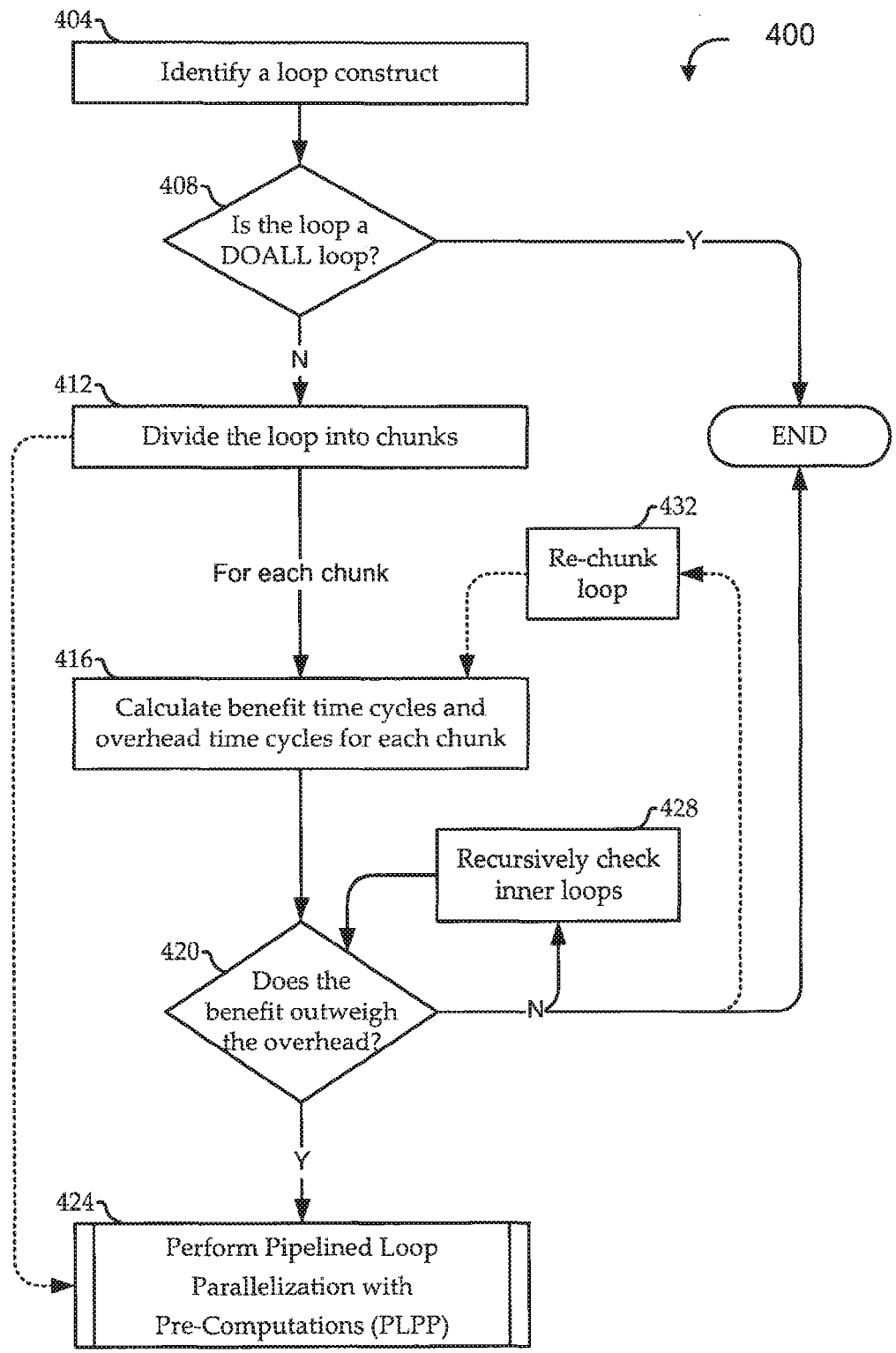
FIG. 4, an illustrative method is shown for determining whether to perform automatic loop parallelization according to various embodiments.

Turning to FIG. 4, an illustrative method 400 is shown for determining whether to perform automatic loop parallelization according to various embodiments. The method 400 begins at block 404 by identifying a loop construct. The loop construct may include one or more "while" loops, "for" loops, and/or any other type of loop. Further, as described above, the loops may be DOALL or non-DOALL loops.

At block 408, a determination is made as to whether the loop is a DOALL loop. As described above, determining that a loop is a DOALL loop involves determining with confidence that there are no interdependences between iterations of the loop. For example, within a DOALL loop, there are no variables having values that depend on previous iterations of the loop. If the loop is determined at block 408 to be a DOALL loop, the method 400 may end. For example, traditional automatic parallelization techniques known in the art may be applied, if desired.

If the loop is determined to be a non-DOALL loop at block 408, the loop may be divided into chunks at block 412. In some embodiments, these chunks are assigned to threads and the method 412 proceeds with pipelined loop parallelization with pre-computations (PLPP) according to block 424 (as described more fully below) without further analysis. In other embodiments, a benefit time and an overhead time (e.g., both in cycles) are calculated for each chunk at block 416. For example, the benefit time may be an estimate of the time saved by pre-computing the chunk, and the overhead time may be an estimate of all time costs associated with using the additional chunk (e.g., costs of synchronizing associated threads).

At block 420, a determination is made as to whether the benefit time is estimated to outweigh the overhead time. If so, the non-DOALL loop may automatic be parallelized according to the PLPP techniques of block 424, as described below. If the overhead time is determined at block 420 to outweigh the benefit time, the method 400 may proceed in a number of ways. Some embodiments proceed by terminating the method 400. For example, the loop is not parallelized at all, or the loop is parallelized according to a traditional parallelization technique, like speculative pre-computation or prefetching techniques.

In certain embodiments, at block 428, the method 400 proceeds by recursively checking inner loops to determine whether those loops are worth parallelizing according to the PLPP techniques of block 424. For example, the compiler processes all the functions in the input source files. For each function, a loop tree, which encodes loop hierarchy, is built. The compiler works through the loop tree from the outermost level towards the inner loops. If a loop is not a candidate (e.g., not a DOALL loop, etc.) the compiler can recursively examine any inner loops at block 428 to check whether each inner loop is a candidate.

Alternatively or additionally, some embodiments may attempt to re-chunk the loop at block 432. For example, dividing the loop into chunks of a different size may cause the benefit time to outweigh the overhead time, even where the original chunk size did not. In some embodiments, the chunk size for all candidate loops is computed to minimize the overhead. However, if there is value prediction involved (e.g., as described below), the chunk size may also be computed to be small enough to mitigate impacts of misprediction.

In any event, if the loop is determine to be a candidate for PLPP techniques of block 424, various techniques may be used including those described with reference to FIGS. 5-8 herein. According to these PLPP techniques, the loop iterations are divided into multiple chunk that are assigned to threads, such that a main thread and all non-main threads will execute different chunks. Each non-main thread can first execute a skipped down, modified version of the original loop for that chunk.

Embodiments compile the original code into the preparatory code in such a way as to attempt to pre-compute values for later, pipelined execution of the chunks. For example, the preparatory code can execute function calls of the loop, save the inputs to function calls and respective results returned by the function calls, pre-calculate independent or anticipated expression values for subsequent use, etc. Some embodiments attempt to ensure that the function calls have no side effects. The actual chunk may be executed only after the previous logical thread has finished its chunk, thereby maintaining the original behavior of the loop. As described more fully below, some embodiments include prediction and calculation techniques to address situations where the chunk has some dependence on a previous logical chunk.

In some embodiments, the non-main threads and the corresponding accelerated main thread are executed as different hardware threads at runtime. The non-main threads execute the independent or anticipated pre-computation code first and later, in program order, the actual work pieces. Accordingly, the non-main threads are active threads, and not mere assistants to, or accelerators of, the main thread. It will be appreciated that by implementing active non-main threads, it is possible to use more than one thread to accelerate the computations.

Figure 5:
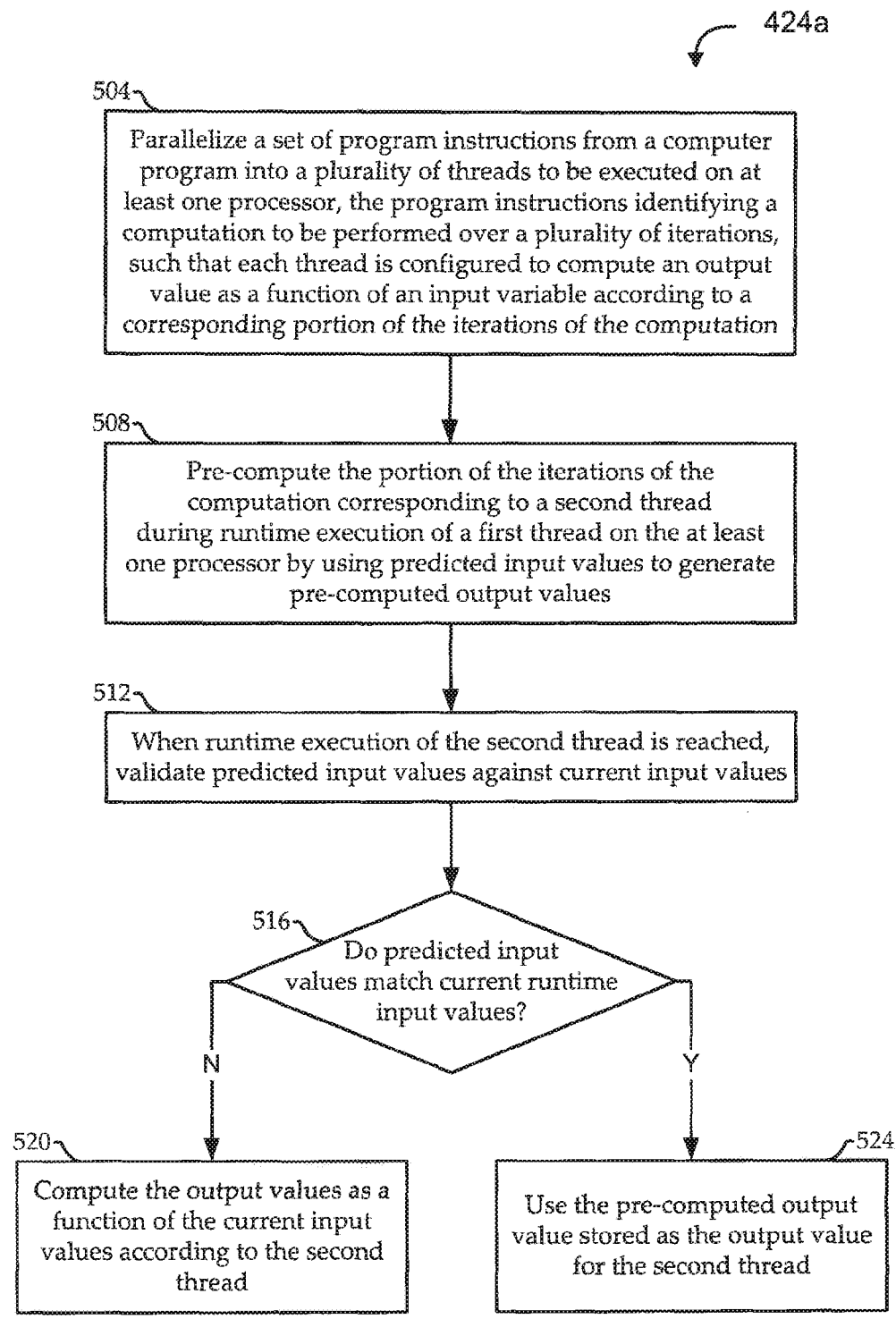
FIG. 5 shows an illustrative method of an implementation of the PUT techniques of FIG. 4, according to various embodiments.

FIG. 5 shows an illustrative method 424*a* of an implementation of the PLPP techniques of block 424 of FIG. 4, according to various embodiments. The method 424*a* begins at block 504 by parallelizing a set of program instructions from a computer program into a plurality of threads to be executed on at least one processor. The program instructions identify a computation to be performed over a plurality of iterations, such that each thread is configured to compute an output value as a function of an input variable according to a corresponding portion of the iterations of the computation.

At block 508, the portion of the iterations of the computation corresponding to a second thread are pre-computed during runtime execution of a first thread on the at least one processor by using predicted input values to generate pre-computed output values. For the sake of illustration, suppose a loop has 100 iterations, and is parallelized into two threads at block 504, so that the first thread executes iterations 1-50, and the second thread executes iterations 51-100. According to block 508, while the first thread executes iterations 1-50 and performs corresponding runtime computations, the second thread attempts to pre-compute output values of iterations 51-100 using predicted input values. For example, when the preceding thread (e.g., the first thread) finishes runtime execution, synchronization techniques are used to instruct the second thread to begin runtime execution. In some embodiments, each thread runs a preparatory (e.g., trimmed down) version of the chunk code for pre-computation and a runtime (e.g., full) version of the chunk code for runtime execution.

Notably, where all the input values for variables used in computations of the second thread are independent of computations made by other iterations, the pre-computations will match any runtime computations made by the second thread in program order. However, inter-chunk dependences may cause computations of one thread to affect the input values used by subsequent threads. For example, suppose that a computation of the loop is a function of the value at memory location X, but the loop also affects the value stored at location X. In this case, it may be difficult or impossible to predict the value at X for a given loop iteration until some previous iteration has finished affecting the value at X.

At block 512, runtime execution of the second thread is reached, and the predicted input values of input variables are validated against current input values of those variables. For example, during the pre-computation at block 508, all predicted input values are stored along with the pre-computed final values for the thread (e.g., in a cache associated with the thread). When an indication is received to run the second thread in its proper program execution order, the values of the input variables that were used in pre-computations are checked.

At block 516, a determination is made as to whether the predicted input values used for the pre-computation match the current runtime input values. For the sake of clarity, it is assumed that pre-computation of the second thread has completed in time for the determination at block 512. If this is not the case, various techniques may be used as described more fully below. As described above, a determination that the predicted and runtime values of the input variables are equal indicates that the values of that variable were not affected by a previous loop iteration. This does not necessarily indicate an absence of interdependences. For example, previous iterations may affect the variable value only in certain instances, may have changed the value multiple times resulting in a return to the original value, etc.

If it is determined at block 516 that the predicted and runtime values of the variables match, the pre-computed output values for the thread can be used at block 524 without any re-computation. For example, if f(X)=Y, the value of Y will be the same so long as the value of X remains the same. If, however, it is determined at block 516 that the value of one or more input variables to the thread have changed (i.e., that the predicted value is different from the corresponding runtime value), the method 424a continues with runtime computation according to the thread at block 520. For example, rather than using hardware transactional memory support (e.g., checkpoint/commit code) to check the computations and roll-back to correct any errors, runtime execution of the threads may proceed in program order as if the particular pre-computation did not occur.

For the sake of illustration, consider the following loop code to be executed by a main thread:

```
for (i=1; i <= end_main; i++) {
    a[i] = b[i] + foo(a[i]);
}
```

A call is made to a function named "foo" within the body of the loop, which computes an output value as a function of input variable "a[i]". It is assumed that "foo" does not modify any global state. According to chunking of the code, the jth non-main thread may execute the following code in program order at runtime:

```
for (i=start_j; i <= end_j; i++) {
    a[i] = b[i] + foo(a[i]);
}
```

During pre-computation (e.g., at block 508), the on-main thread may, in fact, execute the following code:

```
for (i=start_j; i <= end_j; i++) {
    res_foo[i]=foo(a[i]);
    input_foo[i]=a[i];
}
<wait until the previous logic thread has completed its computation>
for (i=start_j; i <= end_j; i++) {
    val_foo = (a[i] == input_foo[i])? res_foo[i] : foo(a[i]);
    a[i] = b[i] + val_foo;
}
```

It is worth noting that, the non-main threads actively execute the chunk code at runtime in program order. However, when the pre-computation is validated, the function call (e.g., "foo(a[i])") can be replaced by the pre-computed value (e.g., "val_foo"), thereby avoiding the runtime computation.

Figure 6:
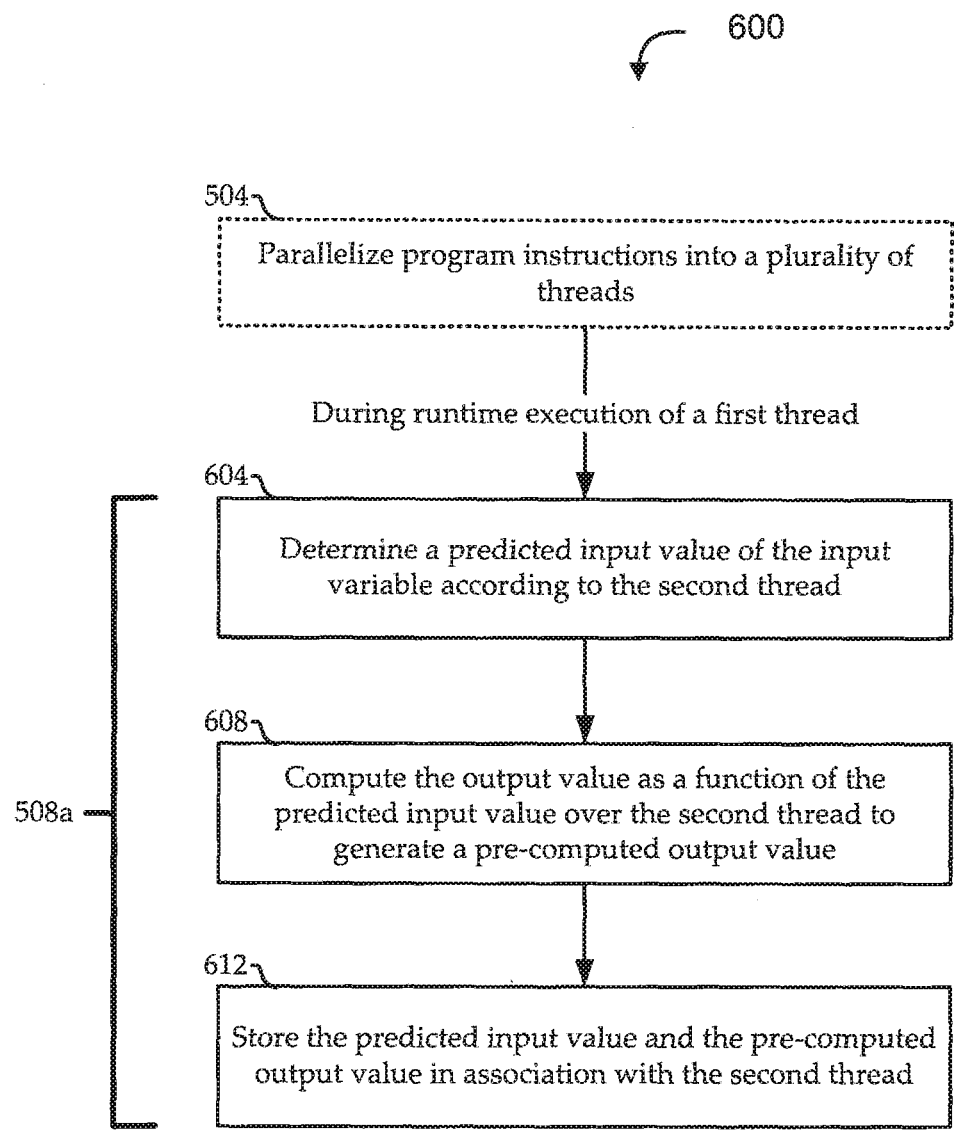
FIG. 6 shows an illustrative method that includes an embodiment of the pre-computation techniques of FIG. 5.

FIG. 6 shows an illustrative method 600 that includes an embodiment of the pre-computation techniques of block 508 of FIG. 5 (illustrated as 508a). For the sake of context, block 504 of FIG. 5 is shown with a dashed line. Accordingly, the method 600 is assumed to begin after parallelization of the program instructions into threads. For each non-main thread, predicted input values are determined for each input variable of the loop at block 604. For example, in the above example, "a[start_j]" may indicate a value stored at the "start_j" location of an array "a".

At block 608, the output values are computed as a function of the predicted input value over the second thread to generate pre-computed output values. For example, in the above example, for each "i", the function "foo(a[i])" is evaluated to compute a corresponding output value ("res_foo[i]"). At block 612, the predicted input values and the corresponding pre-computed output values are stored in association with the second thread. For example, for each "i", "a[i]" is stored as "input_foo[i]" and the result of "foo(a[i])" is stored as "res_foo[i]".

In some embodiments, each non-main thread first will try to pre-compute values and will also prefetch instructions and/or data to its local cache before executing the loop body assigned to itself. That is, each non-main thread may assist or accelerate its own execution of the assigned chunk (e.g., as opposed to accelerating the main thread). Typically, the pre-computation times for each chunk will be less than the runtime execution times for those chunks. Accordingly, the pre-computation loop-execution may actually overlap with the execution of previous chunks of the loop, such that the pre-computation time can almost be considered as "free" if measured using wall clock time. As discussed above, when pre-computed values can be used to avoid runtime computations, wall clock time may even be reduced.

Figure 7:
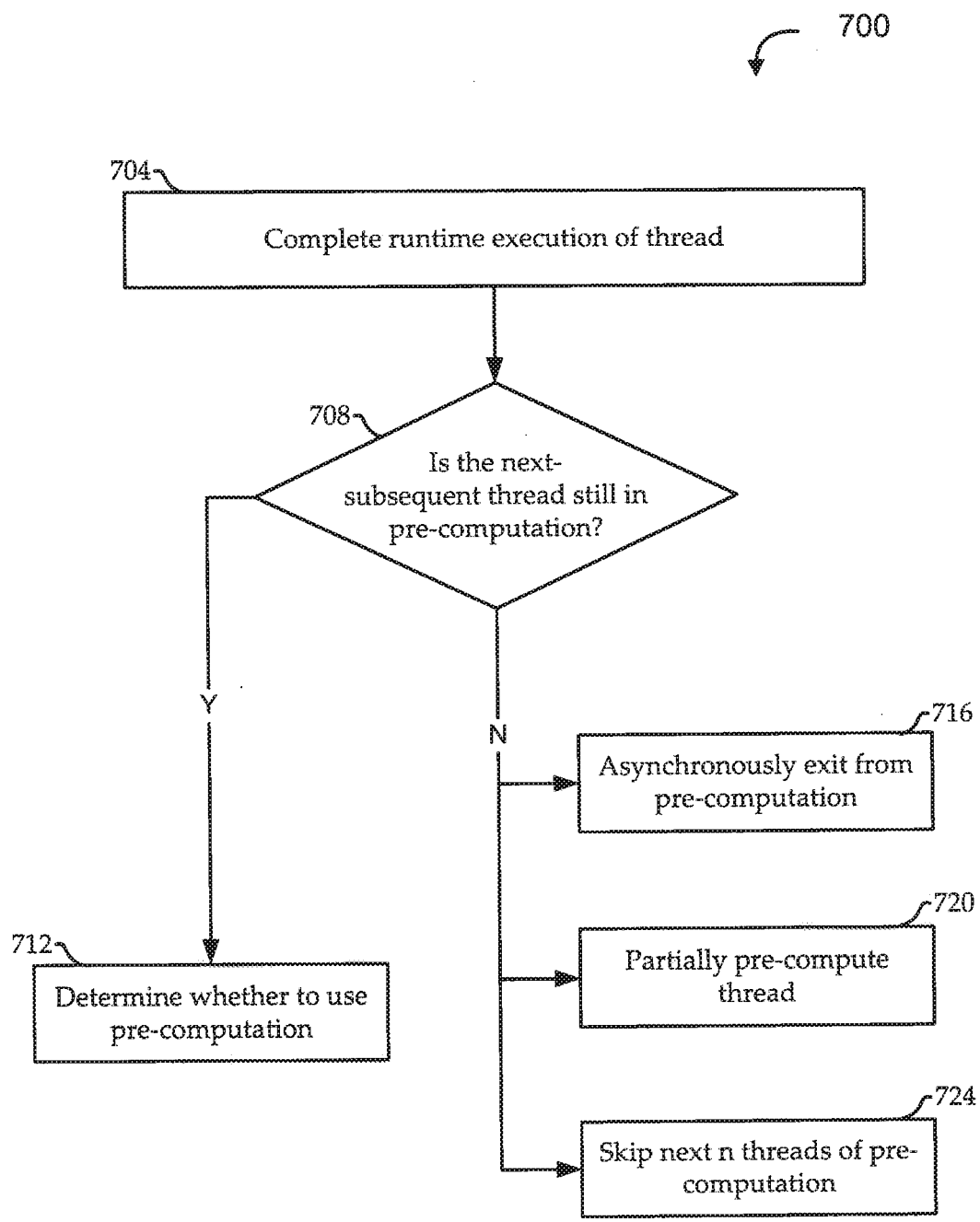
FIG. 7 shows an illustrative method for handling various pre-computation timing scenarios.

FIG. 7 shows an illustrative method 700 for handling various pre-computation timing scenarios. At block 704, the method 700 completes runtime execution of a thread (e.g., the main thread or a non-main thread). A determination is made at block 708 as to whether the subsequent thread is still in pre-computation. In some cases, excessive pre-computation times may result in a situation where a non-main thread is still in the pre-computation phase but the previous thread has completed its chunk. As discussed above, if it is determined that the pre- computation has completed, the method 700 may proceed to determine whether to use the pre-computation at stage 712 (e.g., according to blocks 512-524 of FIG. 5).

If it is determined that the next-subsequent thread is still in pre-computation, the method 700 may proceed in various ways. In some embodiments, the method 700 (e.g., the compiler) allows for exit from the pre-computation phase at block 716. For example, the pre-computation can be asynchronously aborted, and runtime computation may proceed for that chunk. In other embodiments, the method 700 performs partial pre-computation based on a conservative estimate of available time accounting for execution time variance at block 720. For example, the compiler may have assumed processing times associated with certain functions, which can be used to estimate execution times.

In still other embodiments, the method 700 skips pre-computation for a number of non-main threads at block 724. If there is a high estimate of pre-computation time and a low estimate for execution of chunks by previous threads, some number of non-main threads can be skipped. For example, if the pre-computation time is estimated as $T_P$ and the chunk execution time is estimated as $T_C$, a first ceiling ($T_P/T_C$) of non-main threads could be skipped for pre-computation.

It is worth noting that certain techniques described above (e.g., skipping a certain number of loops for pre-computation) may be more difficult to implement when there is data dependence for the pre-computation loops between adjacent chunks. If such data dependences exist, additional techniques may be implemented to perform useful pre-computation (e.g., by the compiler).

One such technique is to predict variable values when they are highly predictable. For the sake of illustration, consider the following loop:

```
for (t = 0; t < n; t++) {
    if (a[t] == 0) continue;
    k = k + const_c;
    ... foo(k, b[k]) ...
}
```

A variable value may be considered highly predictable if a future iteration's value for that variable can be calculated using the current iteration's value and well-established local values (e.g., the loop index) with a high confidence. Suppose that the compiler (e.g., through profiling or static analysis) finds that the "continue" statement in the above illustrative loop is very rarely executed. The compiler may then decide that "k" is highly predictable by assuming that the "continue" statement is never executed at runtime. A similar example may be where the value of "k" changes only if an error condition is detected (which presumably would occur rarely at runtime).

A threshold to decide whether a variable's value is highly predictable may be determined at compile time. Such a threshold value can be a fixed empirical value, or it can be calculated differently based on the misprediction impact. For example, if the misprediction can render the pre-computation completely useless, the compiler may use 99% correct as the threshold. To minimize the potential performance impact due to misprediction, strip-mining of the original loop may be employed to avoid a large chunk size for each thread.

Another technique for cases when there is data dependence for the pre-computation loops between adjacent chunks is to avoid prediction or re-computation. If the value prediction rate is not high enough, the non-main thread can choose to not execute the pre-computation loop until its previous logical thread has finished its own pre-computation loop and has finished the computation of the input values for the current thread. For example, rather than fully parallelizing all threads, individual threads or groups of threads may be overlapped so as to be partially parallelized.

For the sake of illustration, the jth non-main thread of the above illustrative loop code may be expressed for this type of technique as follows:

```
<wait for (j−1)th thread to finish its pre-computation
loop>
/* after this "k" will available, assume it is start_k */
k = start_k;
for (t = start_j; t <= end_j; t++) {
    if (a[t] == 0) continue;
    k = k + const_c;
    res_foo[t] = foo(k, b[k]);
    input_foo_k[t]=k;
    input_foo_b_k[t]=b[k];
}
<signal completion of pre-computation to (j+1)th thread>
<wait for previous "j−1" thread to finish its chunk work>
k = start_k;
for (t = start_j; t <= end_j; t++) {
    if (a[t] == 0) continue;
    k = k + const_c;
    ...(input_foo_k[t] == k && input_foo_b_k[t] == b[k] )?
    res_foo[t] : foo(k, b[k]); ...
}
<signal completion of chunk work to (j+1)th thread>
```

It is worth noting that the above scheme can be implemented using only two hardware threads. For example, the third logical thread can reuse the hardware thread of the first logical thread. It is further worth noting that, if the pre-computation time is greater than the runtime execution time for the chunk, there may be an execution time gap between two consecutive chunk work executions. This may increase the execution time of the transformed code.

In such a situation, embodiments may use the compiler will try yet another technique for cases when there is data dependence for the pre-computation loops between adjacent chunks. Suppose the value for data which has inter-chunk dependence is not highly predictable and the pre-computation time is determined to be greater than the chunk execution time. In some embodiments, a thread can re-compute the input values by executing part of the previous thread's chunk. For example, if the time taken for such re-computation is less than the chunk execution time, there may be no gap between two consecutive chunk loop executions at runtime.

For the sake of illustration, consider again the following loop:

```
for (t = 0; t < n; t++) {
    if (a[t] == 0) continue;
    k = k + const_c;
    ... foo(k, b[k]) ...
}
```

The following pseudo code shows how re-computation of the input values can be implemented for the jth thread:

```
<wait for previous thread to start the pre-computation
loop if the previous thread is a non-main thread, or the
chunk loop if the previous thread is the main thread>
start_k = <the correct input "k" value for thread j−1>
for (t=start_{j−1}; t <= end_{j−1}; t++) {
    if (a[t] == 0) continue;
    start_k = start_k + const_c;
}
/* now start_k is the correct input, "k" value for thread
j */
<signal to thread j+1 that correct input "k" for thread j
is available>
/* execute the value pre-computation loop for the thread
j */
k = start_k;
for (t = start_j; t <= end_j; t++) {
    if (a[t] == 0) continue;
    k = k + const_c;
    res_foo[t] = foo(k, b[k]);
    input_foo_k[t]=k;
    input_foo_b_k[t]=b[k];
}
<wait for previous "j−1" thread to finish its chunk work>
k = start_k;
for (t = start_j; t <= end_j; t++) {
    if (a[t] == 0) continue;
    k = k + const_c;
    ... (input_foo_k[t] == k && input_foo_b_k[t] == b[k])?
    res_foo[t] : foo(k, b[k]); ...
}
```

It is worth noting that there are several synchronization points in the above illustrative code. For example, the jth non-main thread waits until the (j−1)th thread has the correct input "k" value so that it can pick up this value and compute its input "k" value. After it computes the correct "k" value, it signals availability to the (j+1)th thread. Then the jth thread can begin to execute the pre-computation loop and the chunk loop (e.g., as described above with reference to FIGS. 5 and 6).

After signaling the next thread that the input value for a current thread is available, the current thread can take pre-computation time plus chunk execution time to finish its work. At the same time, the next thread can take the recompute time plus pre-computation time, and then wait for the current thread to finish its chunk work. If the recompute time is less than the chunk time, the next thread can enter a spin waiting loop before the previous thread really finishes the chunk loop. Thus, the next thread can immediately start its chunk loop, without any spin waiting gap at runtime. Typically, the recompute time should be smaller than the chunk time. However, in certain cases, if the loop for input computation contains too many loads, and those loads are predicted to be cache misses, the recompute time may be larger than the chunk time (i.e., the loads may end up being cache hits during the chunk loop execution). Accordingly, if the recompute time is more than the chunk time for a loop, the loop may not be considered as a candidate for PLPP techniques.

It will be appreciated that various types of loop constructs may be parallelized according to the PLPP techniques described herein. For example, if a "while" loop is encountered, it may be converted for the purposes of PLPP processing into a "for" loop with an artificial iteration counter and a possible "break" statement inside the loop body to terminate the loop if the condition does not hold for the original "while" loop.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing front the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
generating, using a compiler, a set chunks for each of a plurality of non-DOALL loops within a set of program instructions of a computer program;
determining, using the compiler, a subset of the set of chunks for which an estimated time saved by pre-computing the chunk outweighs an estimated overhead time associated with pre-computing the chunk;
parallelizing, using the compiler, the set of program instructions associated with the subset of chunks into a plurality of threads to be executed on at least one processor, the program instructions identifying a computation to be performed over a plurality of iterations, such that each thread is configured to compute an output value as a function of an input variable according to a corresponding portion of the iterations of the computation; and
compiling executable program code from the parallelized set of program instructions, so that, during runtime execution of a first thread on the at least one processor, the portion of the iterations of the computation corresponding to a second thread are pre-computed by:
determining a predicted input value of the input variable according to the portion of the iterations of the computation corresponding to the second thread;
computing the output value as a function of the predicted input value over the portion of the iterations of the computation corresponding to the second thread to generate a pre-computed output value; and
storing the predicted input value and the pre-computed output value in association with the second thread; and
subsequent to runtime execution of the first thread and prior to runtime execution of the second thread:
determining a current input value of the input variable according to the portion of the iterations of the computation corresponding to the second thread;
comparing the current input value to the predicted input value stored in association with the second thread; and
computing the output value as a function of the current input value over the portion of the iterations of the computation corresponding to the second thread only when the current input value does not equal the predicted input value stored in association with the second thread.

2. The method of claim 1, further comprising:
using the pre-computed output value stored in association with the second thread as the output value for the portion of the iterations of the computation corresponding to the second thread when the current input value equals the predicted input value stored in association with the second thread.

3. The method of claim 1, further comprising:
determining whether the set of program instructions includes any cross-iteration dependencies prior to parallelizing the set of program instructions into the plurality of threads,
wherein the parallelizing step is performed only when the set of program instructions is determined to include at least one cross-iteration dependency.

4. The method of claim 1, wherein parallelizing the set of program instructions from the computer program into the plurality of threads to be executed on the at least one processor comprises:
generating a stripped down version of the set of program instructions, wherein the second thread executes the stripped down version of the set of program instructions when performing the pre-computing the portion of the iterations of the computation corresponding to the second thread step.

5. The method of claim 1, further comprising:
synchronizing the threads to preserve an iteration order associated with the set of program instructions during runtime execution.

6. The method of claim 1, further comprising:
during runtime execution of the first thread on the at least one processor, using the second thread to prefetch program components to a local data store associated with the second thread.

7. The method of claim 1, wherein parallelizing the set of program instructions from the computer program into the plurality of threads to be executed on the at least one processor comprises assigning the first thread to be executed on a first logical processor and assigning the second thread to be executed on the second logical processor.

8. The method of claim 7, wherein each of the first logical processor and the second logical processor corresponds either to a processor core or a processor core pipeline.

9. The method of claim 1, further comprising:
estimating an execution time for runtime execution of the set of program instructions corresponding to a thread;
estimating a pre-computation time for pre-computing the portion of the iterations of the computation corresponding to a thread; and
during runtime execution of the first thread on the at least one processor, pre-computing the portion of the iterations of the computation corresponding to the second thread only when the pre-computation time is estimated to be less than the execution time.

10. The method of claim 1, further comprising:
estimating an execution time for runtime execution of the set of program instructions corresponding to a thread;
estimating a pre-computation time for pre-computing the portion of the iterations of the computation corresponding to a thread; and
during runtime execution of the first thread on the at least one processor, performing only a partial pre-computing of the iterations of the computation corresponding to the second thread when the pre-computation time is estimated to be greater than the execution time.

11. The method of claim 1, further comprising:
detecting completion of runtime execution of the first thread on the at least one processor prior to completing pre-computing the portion of the iterations of the computation corresponding to the second thread; and
asynchronously stopping the pre-computing step in response to detecting the completion of runtime execution of the first thread.

12. The method of claim 1, further comprising:
determining whether the predicted input value of the input variable can be predicted with at least a threshold confidence level,
wherein the pre-computing step is performed only when the predicted input value of the input variable can be predicted with at least the threshold confidence level.

13. The method of claim 1, further comprising:
determining whether the predicted input value of the input variable can be predicted with at least a threshold confidence level, such that, when the predicted input value of the input variable cannot be predicted with at least the threshold confidence level, pre-computing the portion of the iterations of the computation corresponding to the second thread further comprises:

re-computing a portion of the first thread to output a computed value of the input variable,
wherein determining the predicted input value of the input variable comprises using the computed value of the input variable output by the first thread.

14. The method of claim 1, wherein parallelizing the set of program instructions from the computer program into the plurality of threads to be executed on the at least one processor comprises:
optimizing a size of the set of program instructions to parallelize according to minimizing synchronization overhead.

15. A system comprising:
a first logical processor in communication with a first cache;
a second logical processor in communication with a second cache;
a kernel, communicatively coupled with the first logical processor and the second logical processor, and configured,
while compiling a set of program instructions from a computer program, to:
identify a non-DOALL loop in the set of program instructions;
determine a subset of the program instructions that correspond to a chunk of the non-DOALL loop for which an estimated time saved by pre-computing the chunk outweighs an estimated overhead time associated with pre-computing the chunk, the chunk identifying a computation to be performed over a plurality of iterations;
parallelize the subset of program instructions into a plurality of threads, such that each thread is configured to compute an output value as a function of an input variable according to a corresponding portion of the iterations of the computation, and the kernel further configured to assign a first thread to the first logical processor, and to assign a second thread to the second logical processor, the parallelizing being performed in such a way that:
during runtime execution of the first thread on the first logical processor, the second logical processor pre-computes according to the second thread by:
determining a predicted input value of the input variable according to the second thread;
computing the output value as a function of the predicted input value according to the second thread to generate a pre-computed output value; and
storing the predicted input value and the pre-computed output value in the second cache; and
the second logical processor, subsequent to runtime execution of the first thread and prior to runtime execution of the second thread:
determines a current input value of the input variable according to the portion of the iterations of the computation corresponding to the second thread;
compares the current input value to the predicted input value stored in association with the second thread; and
computes the output value as a function of the current input value according to the second thread only when the current input value does not equal the predicted input value stored in the second cache.

16. The system of claim 15, wherein each of the first logical processor and the second logical processor is either a processor core or a processor core pipeline.

17. The system of claim 15, wherein the kernel is further configured to assign a first thread to the first logical processor, and to assign a second thread to the second logical processor, such that:
the pre-computed output value stored in association with the second thread is used as the output value for the portion of the iterations of the computation corresponding to the second thread when the current input value equals the predicted input value stored in association with the second thread.

18. A computer program product residing on a non-transitory, processor-readable medium and having processor-readable instructions, which, when executed, cause a processor to compile a set of program instructions from a computer program by performing steps comprising:
identifying a non-DOALL loop in the set of program instructions;
determining a subset of the program instructions that correspond to a chunk of the non-DOALL loop for which an estimated time saved by pre-computing the chunk outweighs an estimated overhead time associated with pre-computing the chunk, the chunk identifying a computation to be performed over a plurality of iterations;
parallelizing the subset of program instructions into a plurality of threads, such that each thread is configured to compute an output value as a function of an input variable according to a corresponding portion of the iterations of the computation, and such that:
during runtime execution of a first thread, the portion of the iterations of the computation corresponding to a second thread are pre-computed by: determining a predicted input value of the input variable according to the portion of the iterations of the computation corresponding to the second thread; computing the output value as a function of the predicted input value over the portion of the iterations of the computation corresponding to the second thread to generate a pre-computed output value; and storing the predicted input value and the pre-computed output value in association with the second thread; and
subsequent to runtime execution of the first thread and prior to runtime execution of the second thread: a current input value of the input variable is determined according to the second thread; the current input value is compared to the predicted input value stored in association with the second thread; and the output value is computed as a function of the current input value and according to the second thread only when the current input value does not equal the predicted input value stored in association with the second thread.

19. The computer program product of claim 18, having processor-readable instructions, which, when executed, cause the processor to perform steps further comprising:
using the pre-computed output value stored in association with the second thread as the output value for the portion of the iterations of the computation corresponding to the second thread when the current input value equals the predicted input value stored in association with the second thread.

20. The computer program product of claim 18, wherein:
the processor comprises a plurality of logical processors; and
the processor-readable instructions, when executed, cause the processor to parallelize the set of program instructions from the computer program into the plurality of threads by assigning the first thread to be executed on a first logical processor and assigning the second thread to be executed on the second logical processor.

* * * * *

UNITED STATES PATENT AND TRADEMARK OFFICE
CERTIFICATE OF CORRECTION

PATENT NO. : 8,726,251 B2  Page 1 of 1
APPLICATION NO. : 13/074253
DATED : May 13, 2014
INVENTOR(S) : Kalogeropulos et al.

It is certified that error appears in the above-identified patent and that said Letters Patent is hereby corrected as shown below:

In the Specification

Column 3, line 48, delete "computation," and insert -- computation. --, therefor.

Column 4, line 21, delete "PUT" and insert -- PLPP --, therefor.

Column 8, line 35, delete "0xfS38," and insert -- 0xff38, --, therefor.

Column 8, line 64, delete "314-" and insert -- 314h- --, therefor.

Column 11, line 34, delete "chunk" and insert -- chunks --, therefor.

Column 13, line 30, delete "on-main" and insert -- jth non-main --, therefor.

In the Claims

Column 21, line 65, in Claim 16, delete "claim 15," and insert -- claim 15, --, therefor.

Column 22, line 1, in Claim 17, delete "claim 15," and insert -- claim 15, --, therefor.

Signed and Sealed this
Seventh Day of October, 2014

Michelle K. Lee
*Deputy Director of the United States Patent and Trademark Office*